(Model.)
C. J. GUSTAFSON.
STEAM OR WATER THROTTLE VALVE.
No. 578,736. Patented Mar. 16, 1897.
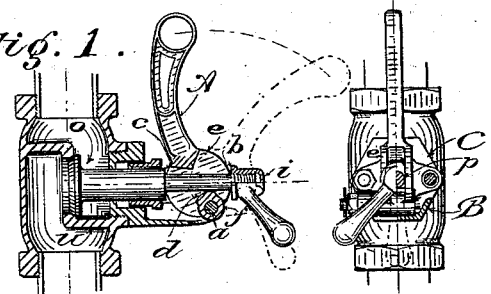
Fig. 1.  Fig. 2.
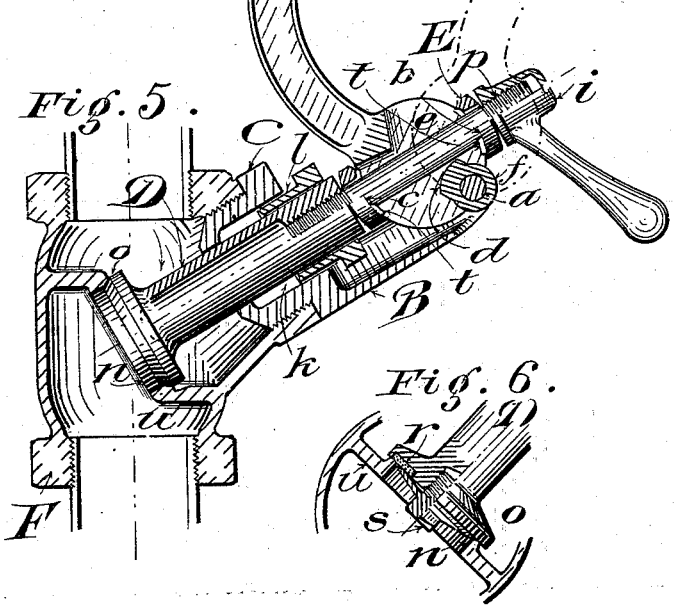
Fig. 5. Fig. 6.
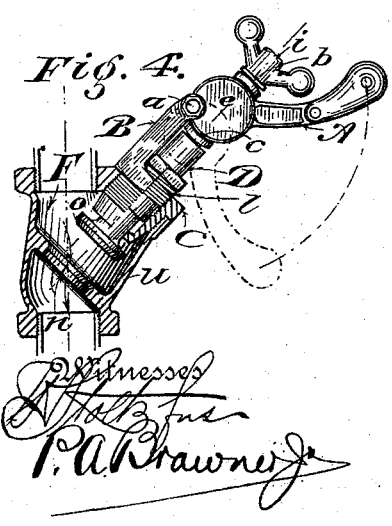
Fig. 4.
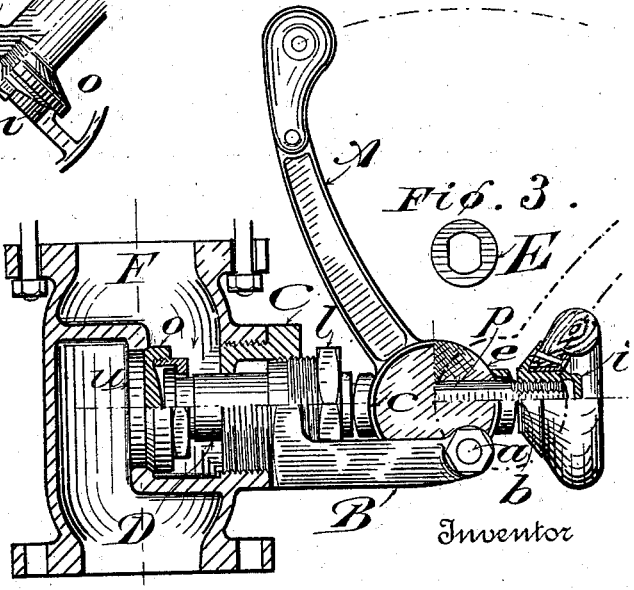
Fig. 3.
Inventor
Chas. J. Gustafson
Witnesses
THE NORRIS PETERS CO., PHOTO-LITHO., WASHINGTON, D. C.

UNITED STATES PATENT OFFICE.

CHARLES J. GUSTAFSON, OF CHATTANOOGA, TENNESSEE.

STEAM OR WATER THROTTLE-VALVE.

SPECIFICATION forming part of Letters Patent No. 578,736, dated March 16, 1897.

Application filed July 14, 1894. Serial No. 517,524. (Model.)

*To all whom it may concern:*

Be it known that I, CHARLES J. GUSTAFSON, a citizen of the United States, and a resident of Chattanooga, in the county of Hamilton and State of Tennessee, have invented certain new and useful Improvements in Steam and Water Throttle-Valves, as fully set forth in the following specification and as shown on accompanying drawings.

This valve is intended for governing the flow of steam, air, or gases, as well as water and other liquids, in pipes to which it may be attached either by screw or flange.

The objects of this invention are to obtain a throttle-valve that can be more easily and quickly opened or closed than the ordinary type of globe and gate valves, and at the same time to maintain perfect control of the position of the valve proper at any capacity or degree of opening, and to afford greater durability than is possessed by the ordinary globe and gate valves operated by a threaded valve-stem. This is accomplished by a proper arrangement and use of the mechanism illustrated in the accompanying drawings, showing different applications of a relatively-enlarged valve-stem in combination with an eccentric-lever, as shown in the accompanying drawings, in which—

Figure 1, Sheet 1, is a sectional side view of the throttle-valve, showing valve-disk and valve-stem in one piece and eccentric-lever secured in position by a gravity-handle lock-nut. Fig. 2 is a front view of same. Fig. 3 is a sectional view of a throttle-valve similar to Fig. 1. Fig. 4 is a partial section through a straightway valve, showing application of the same locking and operating device in a modified form. Fig. 5 is a partial section through a straight-line throttle-valve, showing application of bearing-disks, hollow valve-stem, and eccentric-lever. Fig. 6 is a partial section in detail of valve-disk and valve-stem.

The new and essential features of this valve consist in the arrangement of the eccentric-lever A and the enlarged valve-stem D in combination with the operating and locking devices further described.

The eccentric-lever A consists of a lever or handle joining two circular disks $e$, placed side by side and separated by a space through which the outer end P of the valve-stem D freely passes. A fulcrum-hub $f$ joins the disks $e$ at the lower end of the lever. This eccentric-lever is loosely mounted on the fulcrum-pin $a$, which passes through the fulcrum-brackets B of the cap C.

The valve-stem D is relatively enlarged in diameter on the inner end, where it freely passes through the packing-box $k$ and gland $l$, the objects being to reduce the pressure on the valve by displacement of steam-pressure area, and to furnish a shoulder or bearing $c$, against which the peripheries of the disks $e$ of the eccentric-lever A act in closing the valve.

The reduction of pressure, or, in other words, the balanced feature of the valve, is not claimed in this specification, said feature being reserved for a subsequent application.

The outer end P of the valve-stem D is reduced in diameter and may be of stronger metal than that composing the inner end, Figs. 3 and 5, and carries a shoulder or bearing-surface $b$, applied in various ways, for the periphery of the disks of the eccentric-lever to act against in opening the valve.

The locking device consists, essentially, of the longitudinally-movable shoulder $b$ of the valve-stem D and may be in the form of a thumb-nut, hand-wheel, or thumb-screw.

The bearing caps or washers E, Fig. 5, may be used between the eccentric-lever disks $e\ e$ and the shoulders $b\ c$ of the valve-stem D with all the above-described locking devices. These caps or washers E are made with a hole through the center and have a convex bearing-surface to conform accurately to the periphery of the eccentric-lever disks. The objects of these caps are to furnish a greater bearing-surface against the disks $e$ of the eccentric-lever, to reduce the wear of the shoulders $b\ c$ of the valve-stem D, and to increase the holding power of the locking device.

Ordinarily the operation of the valve is accomplished by moving the eccentric-lever on its fulcrum to or from the valve in closing or opening. To lock the eccentric-lever in any position, tighten the lock-nut $i$, thus clamping the disks $e$ of the eccentric-lever against their bearings $b\ c$.

While the eccentric-lever and its operation here described is similar in some respects to that forming the subject of my Patent No. 480,723, which covers said eccentric-lever in combination with an unbalanced valve, the essential difference consists in its application here to a more or less balanced valve, which I purpose to disclose and claim in a separate application and which is therefore disclaimed here. A further distinction consists in the fact that the lever claimed in Patent No. 480,723 is of the first degree or class, whereas the lever forming the subject of this application is of the second degree. Furthermore, the stem of the valve D in Patent No. 480,723 passes to the atmosphere on the exhaust side, while the valve-stem D set forth in this application passes to the atmosphere on the pressure side.

What I claim, therefore, and desire to secure by Letters Patent of the United States, is the following-described mechanism or its substantial equivalent in producing the same effects:

A quick-action valve for governing the flow of steam, air, water or other gases and liquids, said valve combining in its structure the body F, cap C, eccentric-lever A and the reciprocating valve-stem D with its shoulders $b$ $c$ and carrying the lock-nut $i$ and the washers E E.

CHAS. J. GUSTAFSON.

Witnesses:
J. H. STOLTZFUS,
P. A. BRAWNER.